United States Patent [19]
Bennett

[11] Patent Number: 5,427,189
[45] Date of Patent: Jun. 27, 1995

[54] DIGGING TOOL

[76] Inventor: Richard A. Bennett, 7 Garand Place, Ottawa, Ontario, Canada, K1P 5N7

[21] Appl. No.: 187,074

[22] Filed: Jan. 27, 1994

[51] Int. Cl.⁶ .................. A01D 1/00; A01D 45/00; E21B 10/02
[52] U.S. Cl. .................................. 175/20; 172/22
[58] Field of Search .............. 175/20, 58; 172/21, 172/22

[56] References Cited

U.S. PATENT DOCUMENTS

| | | | |
|---|---|---|---|
| 3,273,930 | 9/1966 | Gottfried | 172/22 X |
| 3,838,739 | 10/1974 | Pollard | 172/21 |
| 3,847,227 | 11/1974 | Myers | 172/22 X |
| 4,489,969 | 12/1984 | Merry | 294/50.8 |
| 4,832,304 | 5/1989 | Morgulis | 248/533 |
| 4,881,602 | 11/1989 | Hansen et al. | 172/22 |
| 4,884,638 | 12/1989 | Hoffman | 172/22 |
| 4,974,682 | 12/1990 | Hoffman | 172/22 |
| 5,046,699 | 9/1991 | Perreault et al. | 248/533 |
| 5,122,014 | 6/1992 | Genfan | 405/244 |
| 5,152,495 | 10/1992 | Jacinto et al. | 248/545 |
| 5,156,369 | 10/1992 | Tizzoni | 248/545 |
| 5,209,534 | 5/1993 | Crenshaw et al. | 172/22 X |
| 5,228,685 | 7/1993 | Williamson | 172/22 X |

FOREIGN PATENT DOCUMENTS 582692  9/1959  Canada .

*Primary Examiner*—William P. Neuder
*Attorney, Agent, or Firm*—Jacobson, Price, Holman & Stern

[57] ABSTRACT

There is described a handheld and actuated tool for making small diameter holes in the earth, comprising an elongated earth penetrating tubular member for cutting a core of earth, and a handle portion connected to the tubular member for transmitting earth penetrating and torsional forces thereto and for pulling the tubular member from the earth to remove the core of earth therein.

10 Claims, 2 Drawing Sheets

DIGGING TOOL

BACKGROUND OF THE INVENTION

1. Field of the Invention

The present invention relates to a digging tool and more particularly to a device for digging small diameter holes in earth or sand.

2. Description of Prior Art

It is now generally agreed that prolonged exposure to the sun can result in increased risk of injury or even disease. This has prompted increased use of umbrellas and other sun blocking devices secured to the ground by means of a pole. If the pole is not inserted sufficiently into the earth or sand, the umbrella will be highly unstable and will easily be blown down even by relatively gentle breezes. Simply by pushing on the pole using body weight or rocking the pole from side to side will achieve only limited penetration particularly in wet sand. Pounding on the pole using a hammer or rock can damage the pole and there is the inconvenience of carrying a hammer to the beach or finding a suitable rock once there.

Another approach is that exemplified in U.S. Pat. Nos. 5,126,369, 5,152,495, 5,122,014, 5,041,699 and 4,832,304 wherein the ground penetrating end of the pole is provided with an auger together with handle means to rotate the auger into the ground. Apart from adding considerable weight and expense to what is otherwise a relatively inexpensive item, the augers are pointed and have sharp edges that can easily penetrate or rip carrying bags and that also pose a risk of damage to vehicles and injury to persons.

Clam diggers such as the one exemplified in U.S. Pat. No. 4,489,969 provide another approach to forming a hole but such devices clearly suffer from the disadvantages of weight, cost and of course simply the inconvenience of carrying such devices to the beach when its only purpose is to make a hole.

An earth perforating tool as shown in U.S. Pat. No. 3,838,739 would be useful but its size and weight clearly make it utterly unsuitable for the purpose at hand. Similar comments obtain with respect to the devices shown in U.S. Pat. Nos. 4,881,602 and 4,974,682 and in Canadian Patent 582,692.

For any device useful to make sufficiently long small diameter holes suitable for anchoring the likes of a beach umbrella to find acceptance with consumers, it must be easy and effective to use, strong, safe, cheap, self-contained and yet sufficiently light and small to carry unobtrusively in a beach or sand toy bag without risk of damage or injury.

SUMMARY OF THE INVENTION

It is an object of the present invention to provide a device for the digging of small diameter holes in earth or sand which is simple and straightforward to operate.

It is a further object of the present invention to provide such a hole digging device which is of a sturdy and unitary yet lightweight construction.

It is still another object of the present invention to provide such a hole digging device that is simple and inexpensive to manufacture.

In accordance with the present invention then, there is provided a handheld and actuated tool for making small diameter holes in the earth, comprising an elongated earth penetrating tubular member for cutting a core of earth, and a handle portion connected to said tubular member for transmitting earth penetrating and torsional forces to said tubular member and for pulling said tubular member from the earth to remove the core of earth therein.

In accordance with a preferred aspect of the present invention, the tool is formed from a single piece of strong lightweight corrosion resistant stock such as aluminum.

DESCRIPTION OF THE DRAWINGS

Preferred embodiments of the present invention will now be described in greater detail and will be better understood when read in conjunction with the following drawings, in which.

DETAILED DESCRIPTION OF THE INVENTION

Figure 1:
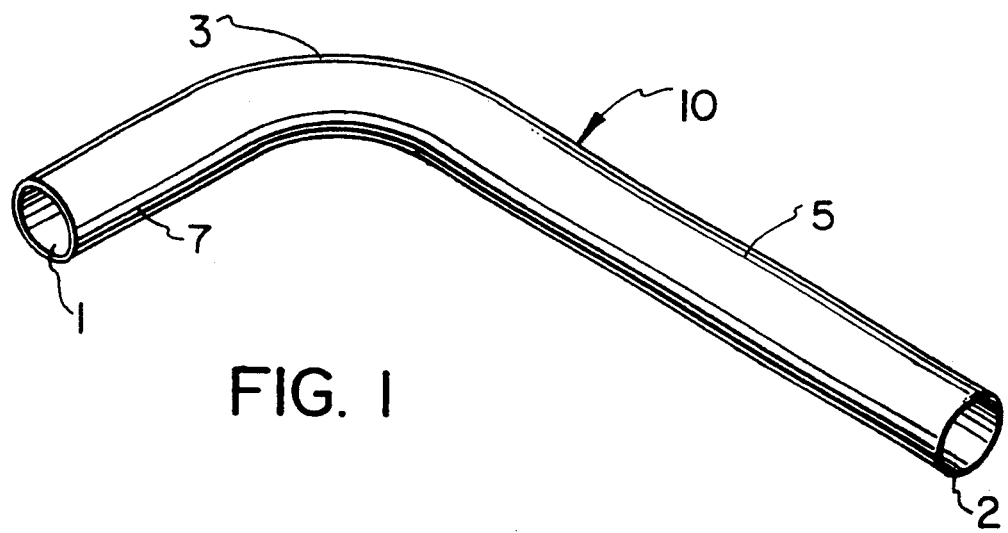
FIG. 1 is a perspective view of the present digging tool.

FIG. 1 illustrates the present digging tool 10 constructed from a single section of elongated hollow stock, which advantageously in this case is non-corroding aluminum tubing having a circular cross-sectional profile. The tool has a first end 1 and an open earth cutting second end 2 with a bend 3 intermediate of the first and second ends 1 and 2 respectively. The portion of the tool between bend 3 and end 2 is used as a boring portion 5. The portion of the tool between bend 3 and first end 1 is conveniently used as a handle 7.

Preferably, the hollow stock used to make the present tool is relatively thin walled to facilitate penetration of the ground by end 2. If thicker stock is used, the edge defining end 2 can be honed or bevelled to lessen ground penetrating resistance.

The tool is used simply by placing its earth cutting end 2 adjacent the surface of the ground at the desired angle thereto permitting for example installation of the umbrella facing into the prevailing winds. By rotating handle 7 back and forth while at the same time applying downward pressure along the direction of boring portion 5 towards the ground, end 2 of the tool is driven quickly into the ground. Once driven to a sufficient depth, the tool is removed by pulling on handle 7. The core of earth within boring portion 5 will be extracted along with the tool to create a small diameter hole suitable, for example, to receive the lower end of the umbrella's pole.

The core of earth within boring portion 5 can be dislodged by shaking or knocking the tool against a hard surface.

Figure 2:
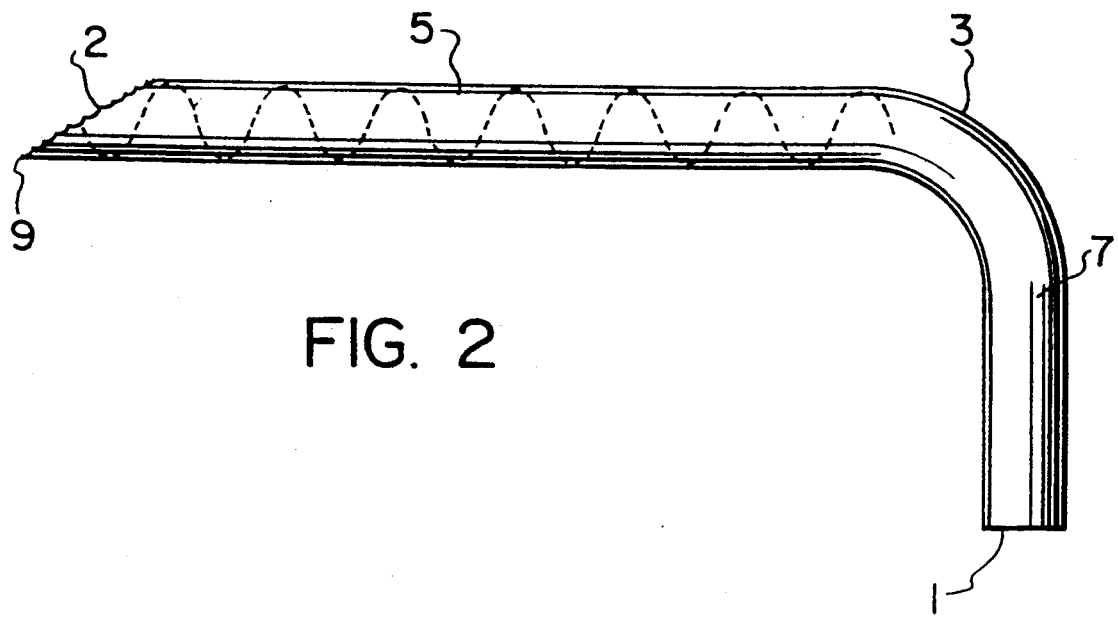
FIG. 2 is a side elevational view of an alternative embodiment of the tool of FIG. 1.

The tool as described above is easily and cheaply produced and is easily used to dig holes in soft earth or sand. If the surface of the ground is somewhat harder, a modified version of the above-described tool as illustrated in FIG. 2 can be used. As will be seen, second end 2 is formed with a diagonal cut across the width of boring portion 5 ending at a point 9 rather than the perpendicular cut illustrated in FIG. 1 to facilitate penetration of the ground.

If further increased cutting capability is required, the cutting edge at the second end 2 can as aforesaid be honed to a sharper edge or serrated.

Figure 3:
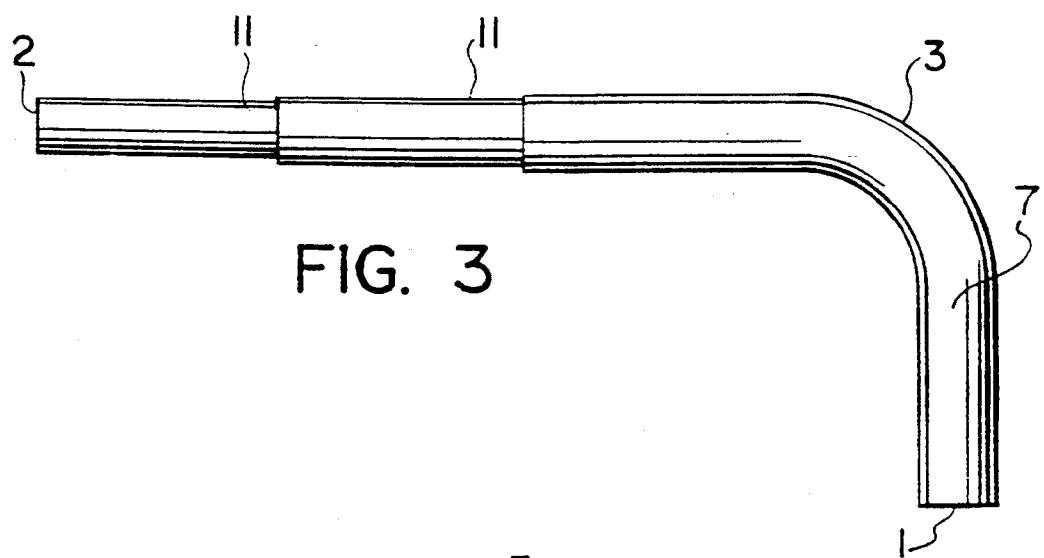
FIG. 3 is a side elevational view of an alternative embodiment of the tool of FIG. 1.

While the above-described digging tool is itself quite compact, should the need arise for a collapsible version to facilitate storage and transportation, boring portion 5 can be constructed of a plurality of concentric elongated hollow portions 11 telescopically joined together as shown in FIG. 3. In the alternative, portions 5 and 7 can be separately constructed for assembly or disassembly such as by means of a threaded connection therebetween as shown by phantom lines in FIG. 1.

Figure 4:
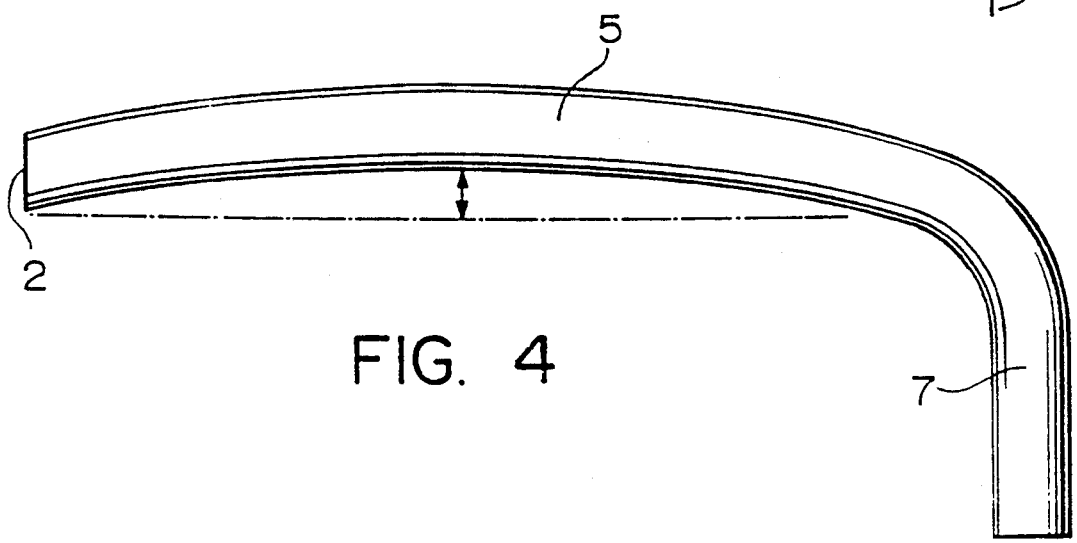
FIG. 4 is a side elevational view of yet another variation to the tool of FIG. 1.

In a further alternative embodiment as shown in FIG. 4, boring portion 5 can be slightly bowed or curved from top to bottom such that when handle 7 is rotated about second end 2, a hole of a larger diameter will be created as the movement of curved boring portion 5 about an arc pushes some earth out of the way outside of the core.

In a further alternative embodiment, the boring portion is internally helically threaded as shown in phantom lines in FIG. 2 to assist in removing the core of earth held within portion 5.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

I claim:

1. A handheld and actuated tool for making small diameter holes in the earth, comprising:

an elongated earth penetrating tubular member for cutting a core of earth; and a handle portion connected to said tubular member for transmitting earth penetrating and torsional forces to said tubular member and for pulling said tubular member from the earth to remove the core of earth therein, wherein said tubular member and said handle portion are formed from a single unbroken piece of tubular stock having a bend therein separating said handle portion from said tubular member.

2. The tool of claim 1 wherein said bend is 90°.

3. The tool of claim 1 wherein said tubular member is formed with an earth cutting end cut at a diagonal to the longitudinal axis of said tubular member to define an elliptically shaped cutting edge.

4. The tool of claim 1 wherein said tubular member has serration means formed thereon to facilitate cutting of the earth.

5. The tool of claim 3 wherein said elliptically shaped cutting edge has serration means formed thereon to facilitate cutting of the earth.

6. The tool of claim 1 wherein said tubular member is curved relative to the longitudinal axis thereof whereby rotation of said tubular member causes the formation of a hole larger in diameter than the core of earth cut by said tubular member.

7. The tool of claim 1 further including a helical thread on an inner surface of said tubular member to facilitate extraction of a core of earth cut thereby.

8. The tool of claim 1 wherein said handle portion and said tubular member are detachably connected together.

9. The tool of claim 1 wherein said tubular stock is a strong, lightweight corrosion resistant material.

10. The tool of claim 1 wherein said tubular member is telescopically extensible and collapsible.

* * * * *